United States Patent
Okabe

(10) Patent No.: US 8,757,941 B2
(45) Date of Patent: Jun. 24, 2014

(54) CUTTING PLOTTER

(75) Inventor: Masafumi Okabe, Tomi (JP)

(73) Assignee: Mimaki Engineering Co., Ltd., Tomi (JP)

( * ) Notice: Subject to any disclaimer, the term of this patent is extended or adjusted under 35 U.S.C. 154(b) by 255 days.

(21) Appl. No.: 13/348,982

(22) Filed: Jan. 12, 2012

(65) Prior Publication Data

US 2012/0103154 A1 May 3, 2012

Related U.S. Application Data

(63) Continuation of application No. PCT/JP2010/003480, filed on May 25, 2010.

(30) Foreign Application Priority Data

Jul. 14, 2009 (JP) .................................. 2009-166046

(51) Int. Cl.
*B23Q 15/18* (2006.01)
*B23Q 15/22* (2006.01)

(52) U.S. Cl.
USPC ........... 409/193; 409/202; 409/207; 409/238; 33/702

(58) Field of Classification Search
USPC ......... 409/186, 187, 193, 194, 202, 207, 208, 409/238, 239; 33/18.1, 430, 443, 626, 628, 33/503, 702
IPC . B23Q 15/18,15/20, 15/22, 15/24, 15/28; B23C 1/06
See application file for complete search history.

(56) References Cited

U.S. PATENT DOCUMENTS

| | | | | |
|---|---|---|---|---|
| 5,333,386 A | * | 8/1994 | Breyer et al. | .................. 33/1 M |
| 8,040,099 B2 | * | 10/2011 | Coleman et al. | .............. 318/652 |
| 2004/0178327 A1 | * | 9/2004 | Widdowson et al. | ......... 250/221 |
| 2008/0033680 A1 | * | 2/2008 | Grupp | ............................ 702/95 |

FOREIGN PATENT DOCUMENTS

| | | | |
|---|---|---|---|
| JP | 2004-148745 | 5/2004 | |
| JP | 2009-050978 | 3/2009 | |
| JP | 2009-068957 | 4/2009 | |
| WO | WO 2008034475 A1 * | 3/2008 | ............... G01B 5/00 |

OTHER PUBLICATIONS

International Search Report for International Application No. PCT/JP2010/003480, Aug. 10, 2010.

* cited by examiner

*Primary Examiner* — Daniel Howell
*Assistant Examiner* — Michael Vitale
(74) *Attorney, Agent, or Firm* — Ditthavong Mori & Steiner, P.C.

(57) ABSTRACT

A cutting plotter includes a medium supporter, a first guide rail, a second guide rail, a carriage, a work tool, a working controller, and a second direction displacement detector. The second direction displacement detector is configured to measure a second guide rail displacement amount. The second guide rail displacement amount indicates a magnitude of displacement of a moving path of the carriage from a predetermined moving path with respect to the second guide rail in a direction perpendicular to a second direction when the carriage is moved in the second direction along the second guide rail. The working controller is configured to execute a control in which a movement control of the second guide rail on the first guide rail is added so that the second guide rail displacement amount is corrected in a movement control of the carriage on the second guide rail.

3 Claims, 9 Drawing Sheets

Fig. 2
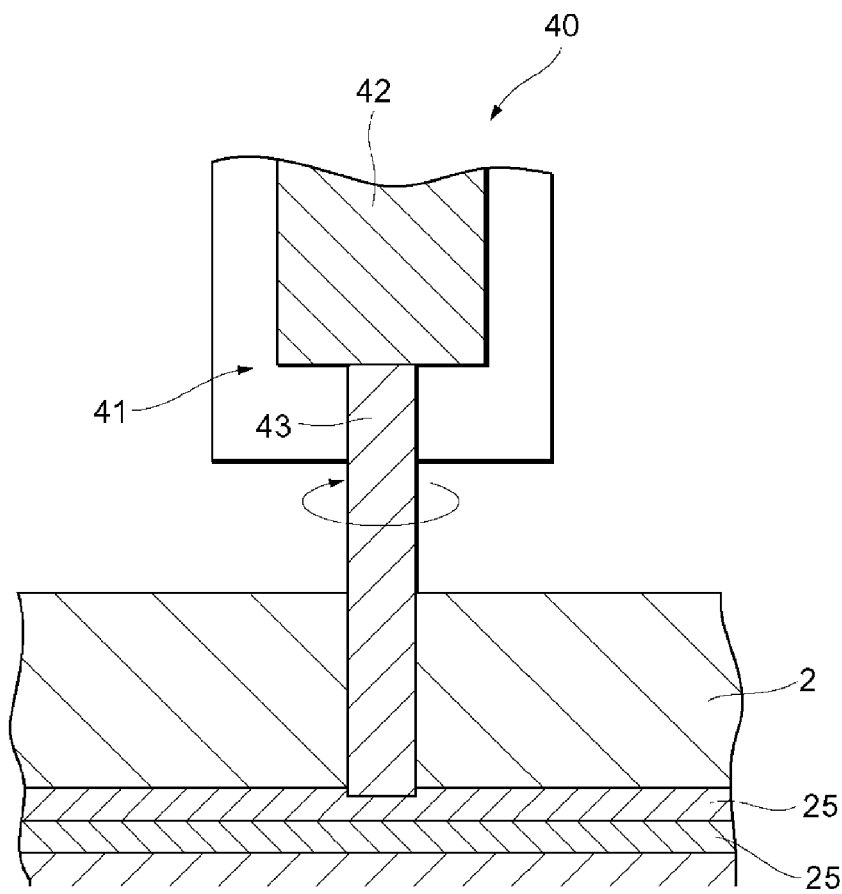
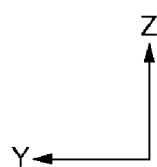

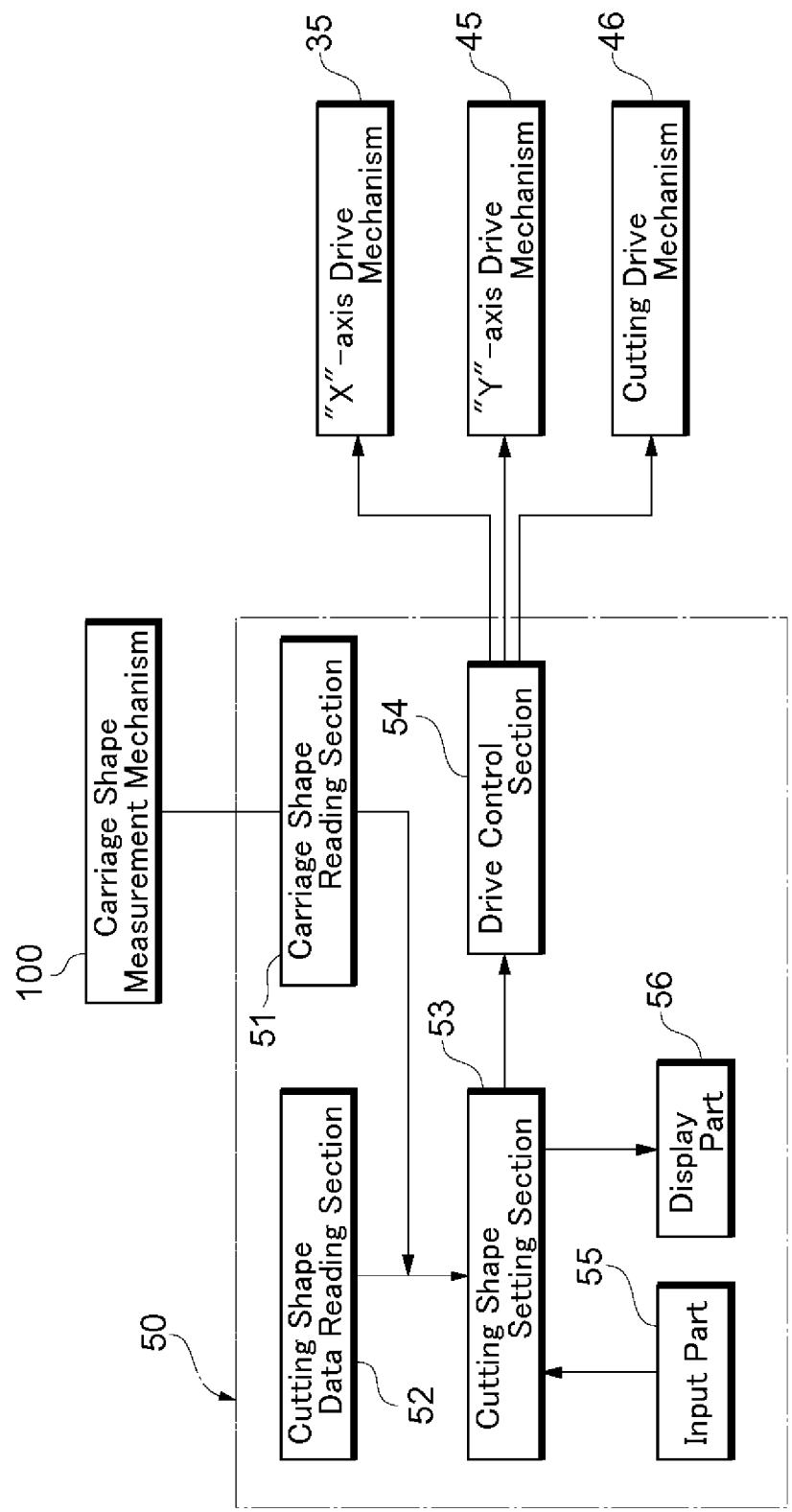

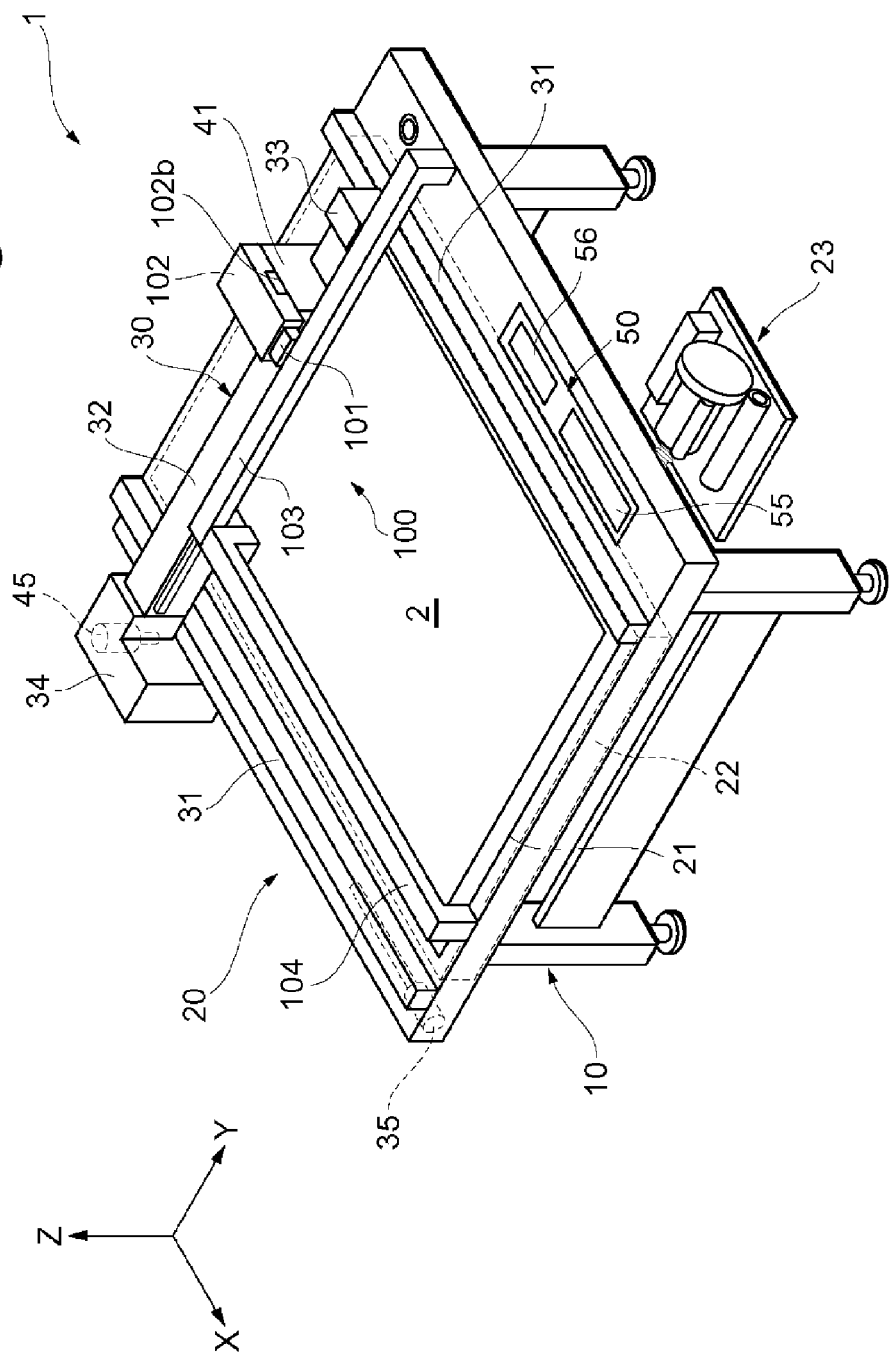

Fig. 7A
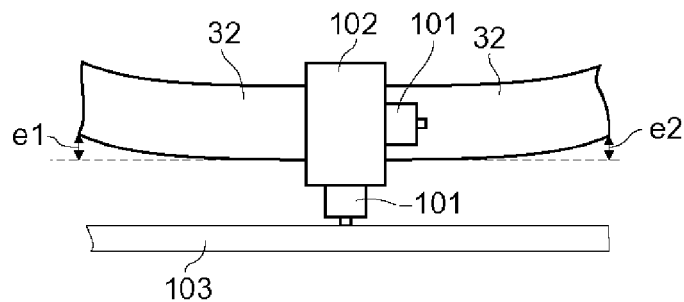
Fig. 7B
Fig. 7C
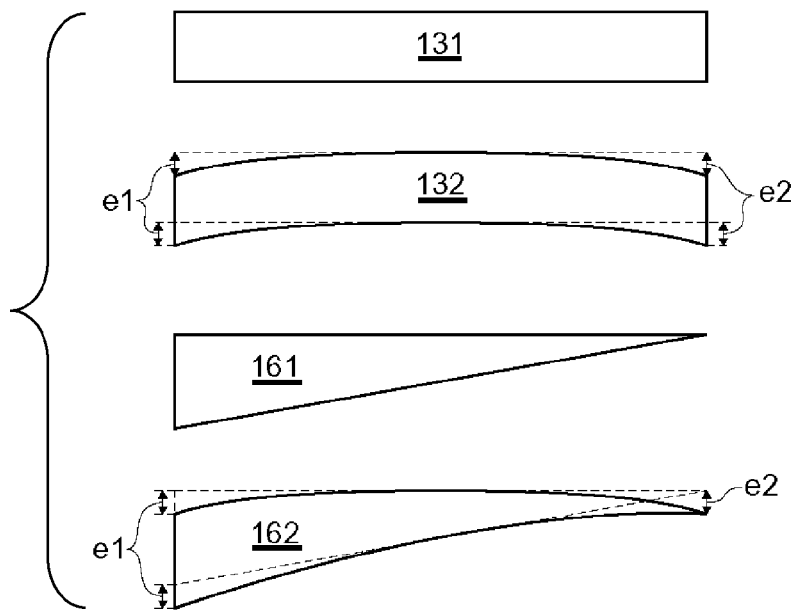
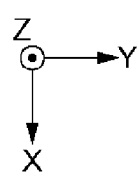

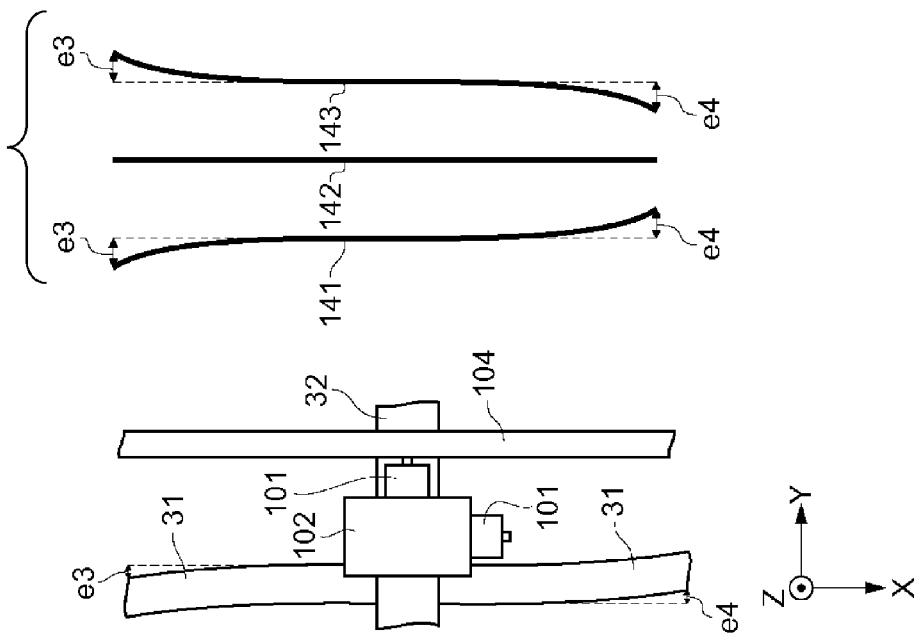

US 8,757,941 B2

CUTTING PLOTTER

CROSS-REFERENCE TO RELATED APPLICATIONS

The present application is a continuation application of International Application No. PCT/JP2010/003480, filed May 25, 2010, which claims priority to Japanese Patent Application No. 2009-166046, filed Jul. 14, 2009. The contents of these applications are incorporated herein by reference in their entirety.

BACKGROUND OF THE INVENTION

1. Field of the Invention

The present invention relates to a cutting plotter.

2. Discussion of the Background

As a medium working apparatus for performing a desired working on a sheet-shaped medium to be worked, a printer apparatus, a cutting plotter and the like have been known. As the medium working apparatus, an apparatus has been well known which is provided with a flat plate-shaped work table on which a medium to be worked is placed and held, a first guide rail which is provided so as to extend in a straight line shape above the work table, a second guide rail (also referred to as a "Y"-bar) which is provided so as to extend in a direction intersecting the extended direction of the first guide rail and is supported movably along the first guide rail, a work tool support means structured of a carriage which is supported movably along the second guide rail and the like, a work tool which is attached to the work tool support means for performing working on the medium to be worked, and a control mechanism which controls movement of the work tool support means and the work tool to control the working (see, for example, Japanese Patent Laid-Open No. 2004-148745).

A cutting plotter is one of the medium working apparatuses as described above and is an apparatus by which a medium to be worked is cut in a desired shape. The cutting plotter having the above-mentioned structure has been also well known. In the cutting plotter, a cutter blade, an end mill or the like is used as a work tool and the work tool is moved in an upper and lower direction with respect to the carriage under a control of the control mechanism to be pressed against and separated from a medium to be worked. Further, movement of the carriage on the second guide rail and movement of the second guide rail on the first guide rail are controlled and, as a result, the work tool is capable of being moved in an upper and lower direction, a front and rear direction, and a right and left direction with respect to the medium to be worked and the medium to be worked can be cut in a desired shape.

SUMMARY OF THE INVENTION

According to one aspect of the present invention, a cutting plotter includes a medium supporter, a first guide rail, a second guide rail, a carriage, a work tool, a working controller, and a second direction displacement detector. The medium supporter includes a support face provided to support a sheet-shaped medium to be worked. The first guide rail is provided in the medium supporter and extending in a first direction substantially parallel to the support face. The second guide rail is provided to be movable in the first direction along the first guide rail and extending in a second direction. The second direction is substantially parallel to the support face and intersects the first direction. The carriage is provided to be movable in the second direction along the second guide rail. The work tool is attached to the carriage to be movable in a third direction to perform a cutting work for the sheet-shaped medium to be worked. The third direction is substantially perpendicular to the support face. The working controller is configured to execute a control for moving the second guide rail in the first direction along the first guide rail, a control for moving the carriage in the second direction along the second guide rail, and a control for moving the work tool in the third direction with respect to the carriage to perform a cutting work for the sheet-shaped medium to be worked by the work tool. The second direction displacement detector is configured to measure a second guide rail displacement amount. The second guide rail displacement amount indicates a magnitude of displacement of a moving path of the carriage from a predetermined moving path with respect to the second guide rail in a direction perpendicular to the second direction when the carriage is moved in the second direction along the second guide rail. The working controller is configured to execute a control in which a movement control of the second guide rail on the first guide rail is added so that the second guide rail displacement amount is corrected in a movement control of the carriage on the second guide rail.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2 is a partially sectional view showing a state where a medium to be worked is being cut by an end mill and which is cut in a direction extending in a longitudinal direction of the end mill provided in the cutting plotter.

FIG. 3 is a block diagram showing a control structure for a cutting work in the cutting plotter.

FIG. 4 is a perspective view showing a state where an "X"-direction jig, a "Y"-direction jig and a displacement sensor are attached to the cutting plotter.

FIG. 7A is a top plan view showing a state where bending of a "Y"-bar which is bent in an "X"-axis direction is measured by using a displacement sensor. FIG. 7B is a view showing measurement result of bending of a "Y"-bar which has been measured by the displacement sensor and cutting data which have been prepared on the basis of the measurement result. FIG. 7C is a view showing desired working regions and cutting data for performing a cutting work in a shape of the working region.

FIG. 9A is a top plan view showing a state where bending of a guide rail which is bent in a "Y"-axis direction is measured by using a displacement sensor. FIG. 9B is a view showing measurement result of bending of a guide rail which has been measured by the displacement sensor and cutting data which have been prepared on the basis of the measurement result. FIG. 9C is a view showing desired working regions and cutting data for performing a cutting work in a shape of the working region.

DESCRIPTION OF THE EMBODIMENTS

Figure 1:
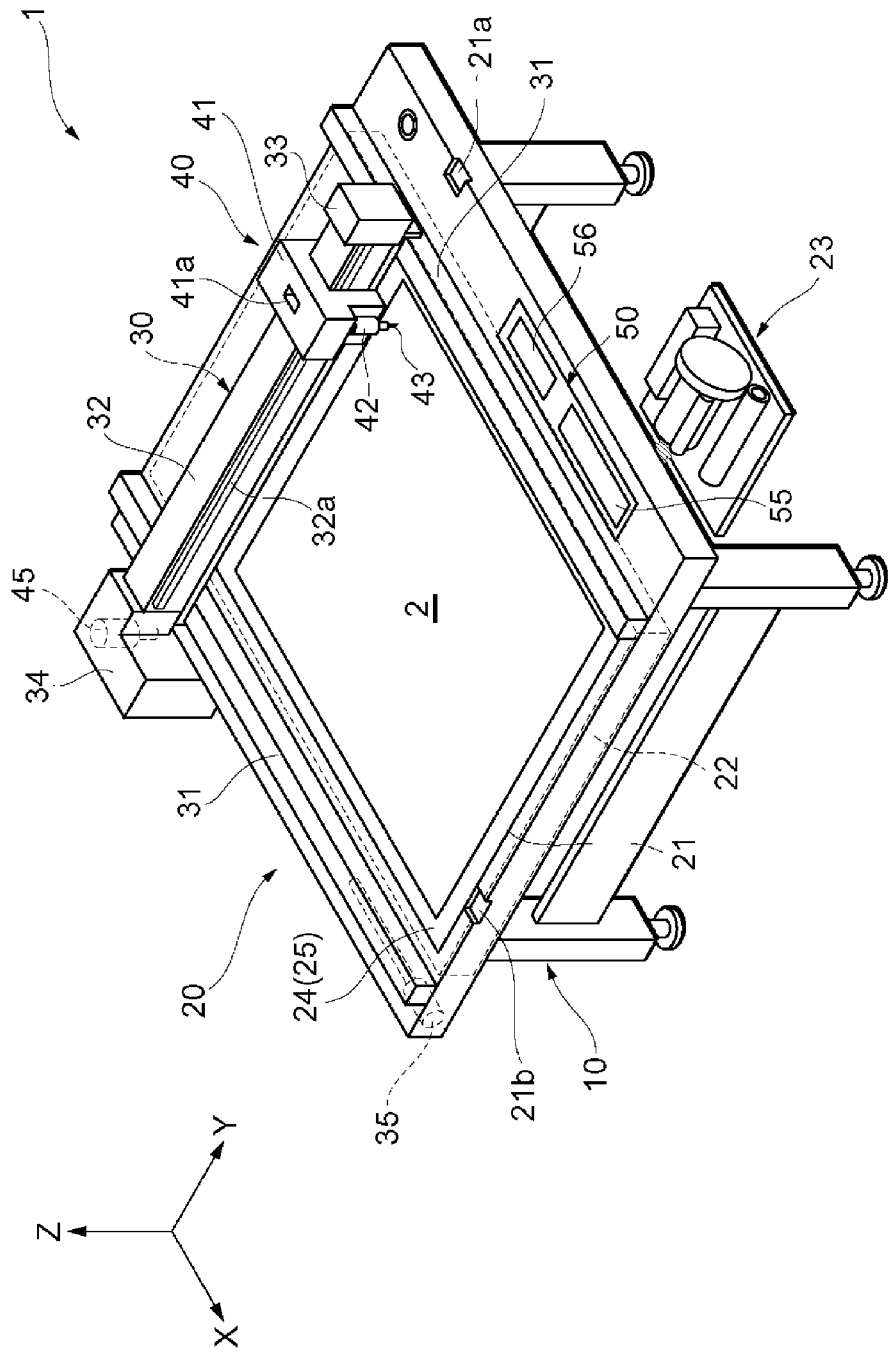
FIG. 1 is a perspective view showing a cutting plotter to which the embodiment of the present invention is applied.

The embodiments will now be described with reference to the accompanying drawings, wherein like reference numerals designate corresponding or identical elements throughout the various drawings.

As an example of a cutting plotter (cutting apparatus) to which the embodiment of the present invention is applied, a schematic structure of an "X"-"Y" plotter type cutting plotter 1 is shown in FIG. 1, in which a sheet-shaped medium to be worked formed of material such as an acrylic plate or an aluminum composite plate is fixed and held by a work table, and an end mill is abutted with the medium to be worked and is moved up and down in an upper and lower direction and is moved in two-axis directions orthogonal to each other in a horizontal plane to perform a cutting work on the medium to be worked in a desired shape. In the following description, an upper direction in the plane of FIG. 1 is set to be a "Z"-axis positive direction, a lower-right direction in the plane of FIG. 1 (direction parallel to a "Y"-bar 32 described below) is set to be a "Y"-axis positive direction, a lower-left direction in the plane of FIG. 1 (direction parallel to a guide rail 31 described below) is set to be an "X"-axis positive direction.

The cutting plotter 1 is structured of a work table 20 for fixing and holding a medium 2 to be worked, a main body frame 10 which horizontally holds the work table 20 and functions as a mounting base for respective mechanisms, an "X"-axis carriage 30 which is supported above the work table 20 movably in the "X"-axis direction (front and rear direction) and is movable in the "X"-axis direction by an "X"-axis drive mechanism 35 described below, a cutting unit 40 which is supported movably in the "Y"-axis direction (right and left direction) along a "Y"-bar 32 described below and is movable in the "Y"-axis direction by an "Y"-axis drive mechanism 45 described below, a control unit 50 which controls a horizontal movement of the "X"-axis carriage 30 and a vertical movement of an end mill 43 described below so that a cutting work for the medium 2 to be worked which is fixed and held by the work table 20 is controlled, and the like.

The work table 20 is structured of a support board 21 having a flat face, a decompression chamber 22 provided on an under face side of the support board 21, a vacuum blower 23 which is capable of exhausting air in the decompression chamber 22 for setting the decompression chamber 22 in a negative pressure, a rectangular vacuum table 24 which is provided at a center portion when the work table 20 is viewed from an upper side and, on which a sheet-shaped medium 2 to be worked is placed so as to be capable of being fixed and held, two sheets of felt 25 having about 3 mm thickness which are placed so as to cover an upper face of the vacuum table 24 and supports the medium 2 to be worked, and the like (see FIGS. 1 and 2).

Placing parts 21a and 21b for placing legs of an "X"-direction jig 103 and a "Y" direction jig 104 described below are provided on the upper face of the support board 21 as shown in FIG. 1. Further, the vacuum table 24 is formed with a large number of minute air holes (not shown) penetrating through in the upper and lower direction. The air holes and the decompression chamber 22 are provided on an under face side of the vacuum table 24 and the upper face of the vacuum table 24 is structured to be covered by two sheet-like shaped felts 25 and thus air can be passed in the upper and lower direction through the air holes and the felts 25. Therefore, the medium 2 to be worked is vacuum-sucked to the vacuum table 24 by setting the decompression chamber 22 in a negative pressure by the vacuum blower 23 and thus the medium 2 to be worked is fixed and held by the vacuum table 24.

The "X"-axis carriage 30 is structured of a pair of right and left guide rails 31 provided on the upper face of the support board 21 so as to extend to be parallel to the "X"-axis direction, a "Y"-bar 32 which is provided so as to extend in the "Y"-axis direction and is held movably in the "X"-axis direction by the guide rails 31, slide blocks 33 and 34 which are respectively fitted to the guide rails 31 and to which a left end part and a right end part of the "Y"-bar 32 are fixed, and an "X"-axis drive mechanism 35 for moving the "Y"-bar 32 in the "X"-axis direction. A support rail of a linear bearing which is referred to as a linear-motion guide or a linear guide is used as the guide rail 31. The "Y"-bar 32 is formed so as to extend in a bar-like shape by using aluminum material and is supported slidably in the "X"-axis direction in a straddled state above the support board 21. The "X"-axis drive mechanism 35 is structured of a ball screw (not shown) which is disposed on the under face side of the work table 20 so as to extend to be parallel to the guide rail 31 in the front and rear direction, a servomotor (not shown) for driving and rotating the ball screw, and a ball nut which is fitted and supported by the ball screw and is fixed to the "X"-axis carriage 30. The "Y"-bar 32 and the slide blocks 33 and 34 are capable of being moved in the "X"-axis direction by driving and rotating the servomotor.

The cutting unit 40 is, as shown in FIGS. 1, 2 and 4, structured to provide with a slider 41 which is fitted to the "Y"-axis guide rail 32a that is fixed to a front face of the "Y"-bar 32 so as to extend in the "Y"-axis direction and is supported so as to be slidably moved in the right and left direction, a rotation drive part 42 which is detachably supported on the front face side of the slider 41 for rotationally driving an end mill 43 described below with an axis extending in its longitudinal direction as a rotation center, the end mill 43 which is detachably structured at a lower part of the rotation drive part 42 and is capable of cutting the medium 2 to be worked, a "Y"-axis drive mechanism 45 which is capable of moving the slider 41 in the "Y"-axis direction, and a cutting drive mechanism 46 which rotates the end mill 43 by the rotation drive part 42 and is capable of moving the end mill 43 in the upper and lower direction with respect to the rotation drive part 42. The slider 41 is provided with an engagement hole 41a on its upper face and, when a protruded part of a sensor support member 102 described below is fitted to the engagement hole 41a, a carriage shape measurement mechanism 100 (described in detail below) can be attached to the slider 41. Further, the end mill 43 is capable of being moved in the upper and lower direction with respect to the rotation drive part 42 and thus, when the cutting drive mechanism 46 rotates the end mill 43 by using the rotation drive part 42 and the rotating end mill 43 is pressed against the medium 2 and moved, a cutting work for the medium 2 to be worked can be performed. In this embodiment, in addition to the end mill 43, a cutter blade or the like can be attached and detached to the rotation drive part 42.

The "Y"-axis drive mechanism 45 is structured of a drive pulley (not shown) and a driven pulley (not shown) which are respectively rotationally provided at a left end side and a right end side of the "Y"-bar 32, a servomotor (not shown) for rotationally driving the drive pulley, and a drive belt (not shown) in an endless belt shape which is extended over the drive pulley and the driven pulley. The slider 41 is fixed to a middle part of the drive belt. In this embodiment, a timing belt whose inner peripheral face is formed with a large number of teeth is used as the drive belt and a timing pulley is used as the drive pulley and the driven pulley and thus movement of the cutting unit 40 (moving direction, moving speed, position in the right and left direction and the like) can be controlled minutely.

The control unit 50 is, as shown in FIG. 3, structured of a cutting shape data reading section 52, a cutting shape setting section 53, a drive control section 54, an input part 55, a display part 56 and the like. The cutting shape data reading section 52 is structured so as to read a desired working shape (hereinafter, referred to as working shape data) inputted through a predetermined working program and a user and transmit the working shape data to the cutting shape setting section 53. The cutting shape setting section 53 prepares cutting data (shape data) which are used at a time of performing a cutting work on a medium 2 to be worked by referring the working shape data received from the cutting shape data reading section 52 and transmits the prepared cutting data to the drive control section 54. The drive control section 54 is capable of controlling the entire apparatus including the respective axis drive mechanisms of the cutting plotter 1. The drive control section 54 controls operations of the "X"-axis drive mechanism 35, the "Y"-axis drive mechanism 45, the cutting drive mechanism 46 and the like on the basis of the cutting data received from the cutting shape setting section 53 and controls horizontal movements of the "X"-axis carriage 30 and the cutting unit 40 and a vertical movement of the end mill 43. In this manner, a cutting work for the medium 2 to be worked which is fixed and held on the work table 20 can be performed by the control of the drive control section 54.

The input part 55 is a touch panel which is provided for inputting instructions by a user for operating the cutting plotter 1. A user instructs a cutting procedure through the input part 55 (for example, instruction for performing a cutting work in a clockwise direction or a counter clockwise direction, and instructions regarding cutting conditions such as a cutting speed and a pressing force of the end mill against a medium to be worked) and, in addition, the user is capable of performing shape measurements of the guide rail 31 and the "Y"-bar 32 by reciprocatedly moving the slider 41 in the "Y"-axis direction and the "Y"-bar 32 in the "X"-axis direction (described in detail below). Further, the display part 59 is used as a display which indicates the cutting conditions, the cutting shape, and operation results of the cutting plotter 1.

Although the guide rail 31 and the "Y"-bar 32 are formed in a straightly extended bar-like shape, minute bending (tolerance of straightness) may be occurred in the manufacturing step. For example, in a case that a length of the "Y"-bar 32 is about 1 m, bending of about 0.9 mm may be occurred. When a cutting work is performed by using the guide rail 31 and the "Y"-bar 32 having such bending, the cutting unit 40 is unable to be straightly moved in the "X" direction and the "Y" direction and thus the cutting work cannot be performed in the shape of the working shape data to deteriorate the quality of the cutting work.

In order to prevent this problem, the cutting plotter 1 in this embodiment is, as shown in FIG. 3, provided with a carriage shape reading section 51 and a carriage shape measurement mechanism 100, and bending of the guide rail 31 and the "Y"-bar 32 is measured by the carriage shape measurement mechanism 100 after the manufacture and before the shipment of the cutting plotter 1 and the working shape data are corrected on the basis of the measurement results. As a result, an actual cutting work is not affected by the bending of the guide rail 31 and the "Y"-bar 32. The structures of the carriage shape reading section 51 and the carriage shape measurement mechanism 100 will be described below.

The carriage shape reading section 51 is provided in the control unit 50 as shown in FIG. 3 and is structured to read bending (hereinafter, referred to as carriage shape data) of the guide rail 31 and the "Y"-bar 32 by the carriage shape measurement mechanism 100 and transmit the read carriage shape data to the cutting shape setting section 53. The cutting shape setting section 53 corrects the working shape data received from the cutting shape data reading section 52 by using the carriage shape data to prepare cutting data (described in detail below).

The carriage shape measurement mechanism 100 is, as shown in FIG. 4, FIGS. 5A and 5B, and FIG. 6, structured of a displacement sensor 101 for measuring bending of the guide rail 31 and the "Y"-bar 32, a sensor support member 102 having fitting holes 102a and 102b to which a protruded part 101a provided in the displacement sensor 101 is fitted and a protruded part (not shown), an "X"-direction jig 103 structured to be capable of disposing and extending in the "Y"-axis direction, and a "Y" direction jig 104 structured to be capable of disposing and extending in the "X"-axis direction. The displacement sensor 101 is capable of being fixed and supported by the sensor support member 102 by fitting the protruded part 101a of the displacement sensor 101 into the fitting holes 102a and 102b of the sensor support member 102. The displacement sensor 101 and the sensor support member 102 are capable of being fixed and supported by the slider 41 by engaging the protruded part (not shown) of the sensor support member 102 with an engagement hole 41a of the slider 41. Further, the displacement sensor 101 in this embodiment is a contact type displacement sensor 101 and, when an object is to be measured, displacement can be measured by abutting a tip end of the measuring part 101b extended in a bar-like shape with the object. The displacement sensor which is used in this embodiment is not limited to a contact type displacement sensor 101. For example, a dial-gauge type displacement sensor or a non-contact type displacement sensor such as an eddy current type or an optical type displacement sensor or an air sensor may be used.

Figure 6:
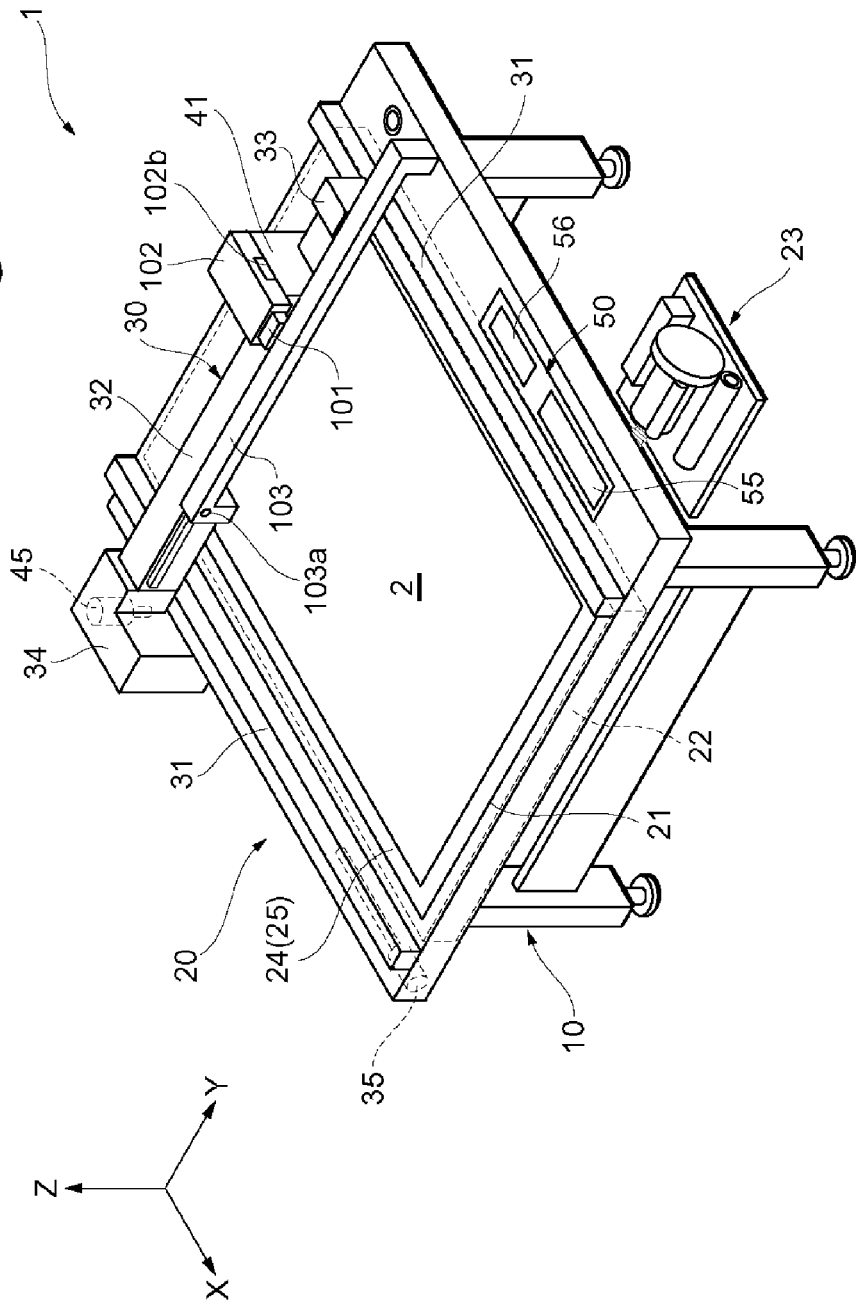
FIG. 6 is a perspective view showing a state where bending in an "X"-axis direction of a "Y"-bar is measured by using an "X"-direction jig in the cutting plotter.

The "X"-direction jig 103 is, as shown in FIG. 6, provided with a hole part 103a for fixing the "Y" direction jig 104. The "Y" direction jig 104 is, as shown in FIG. 4, capable of being fixed to the "X"-direction jig 103 by fitting a protruded part (not shown) provided at one end extending in a longitudinal direction of the "Y" direction jig 104 to the hole part 103a. The jigs 103 and 104 are provided with legs on both end portions extending in the longitudinal direction so that under faces of bar-like portions extending in the longitudinal direction of the jigs 103 and 104 are not contacted with a medium 2, the support board 21 and the like. Further, a tip end of the measuring part 101b of the displacement sensor 101 is set to contact with a face (side face) perpendicular to an "X-Y" plane of the bar-like portions extending in the longitudinal direction of the jigs 103 and 104.

Figure 5A:
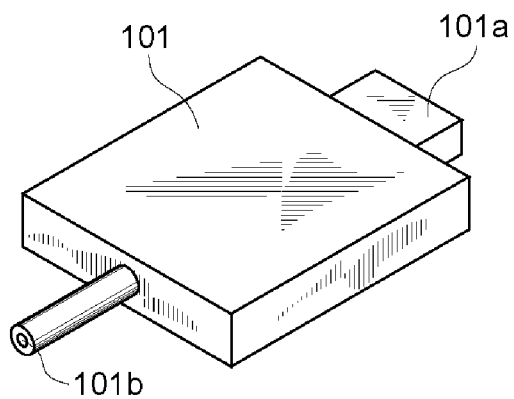
FIG. 5A is a perspective view showing a displacement sensor.
Figure 5B:
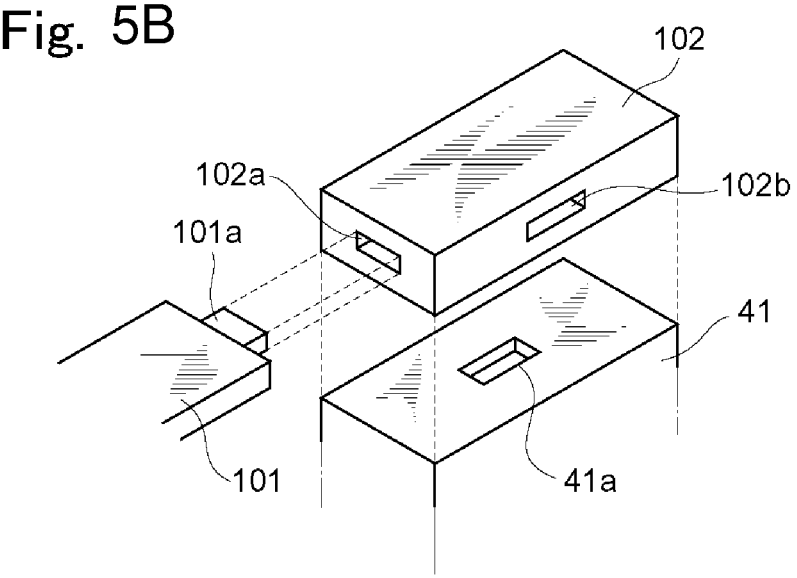
FIG. 5B is a perspective view showing a state where a displacement sensor is to be attached to a sensor support member and the sensor support member is to be attached on a slider.

A method will be described below in which bending of the guide rail 31 and the "Y"-bar 32 is measured by using the cutting plotter 1 and the carriage shape measurement mechanism 100 structured as described above and the measurement results are applied to an actual cutting work. First, a method will be described below in which the bending of the "Y"-bar 32 provided so as to extend in the "Y"-axis direction is measured and the measurement result is applied to an actual cutting work. As an advance preparation, as shown in FIG. 5B, the protruded part (not shown) of the sensor support member 102 is fitted into the engagement hole 41a of the slider 41 and the protruded part 101a of the displacement sensor 101 is fitted into the fitting hole 102a of the sensor support member 102 and thus the displacement sensor 101 is attached so that the tip end of the measuring part 101b is directed to the "X"-axis positive direction. Then, as shown in FIG. 6, the "X"-direction jig 103 is disposed so that its leg provided at one end is placed on the upper face of the placing part 21a, and a fine adjustment of position is performed so that the tip end of the measuring part 101b of the displacement sensor 101 is abutted with the side face of the "X"-direction jig 103.

Next, a case will be described below in which a left end portion of the "Y"-bar 32 is bent by a length "e1" and its right end portion is bent by a length "e2" in the "X"-axis negative direction as shown in FIG. 7A. First, after a power switch is turned on in a state that the "X"-direction jig 103 is disposed as described above, the input part 55 is operated and the slider 41 is reciprocatedly moved in the "Y"-axis direction and measurement of the bending of the "Y"-bar 32 is performed. When the slider 41 is reciprocatedly moved in the "Y"-axis direction, the displacement sensor 101 fixed and supported by the slider 41 is also reciprocatedly moved in the "Y"-axis direction. As a result, as shown in FIG. 7B, the displacement sensor 101 outputs a "Y"-bar shape measurement result 121 of the shape whose left end portion is bent by the length "e1" and right end portion is bent by the length "e2" in the "X"-axis negative direction as a carriage shape data. The carriage shape reading section 51 reads the carriage shape data ("Y"-bar shape measurement result 121) and transmits them to the cutting shape setting section 53.

For example, in a case that working shape data (desired working shape) are a straight line 122 parallel to the "Y"-axis direction as shown in FIG. 7B, when a cutting work is performed without any amendment, a cutting shape like the "Y"-bar shape measurement result 121 is obtained due to the bending of the "Y"-bar 32. In order to prevent this problem, the cutting shape setting section 53 calculates displacement of the bending in the "X"-axis direction of the "Y"-bar shape measurement result 121 with respect to the predetermined straight line 122 and prepares cutting data 123 in which the left end portion is bent by the length "e1" and the right end portion is bent by the length "e2" in the "X"-axis positive direction. As a result, when a cutting work for a medium 2 to be worked is performed on the basis of the cutting data 123 under a control of the drive control section 54, the bending of the "Y"-bar 32 is canceled by the cutting data 123 and thus the cutting work is performed on the straight line 122. As described above, since the working shape data (desired working shape) are corrected to prepare the cutting data 123, the cutting work is performed without being affected by the bending of the "Y"-bar 32. Therefore, for example, in a case that a desired working region is a rectangular shape like the region 131, when the cutting data 132 as shown in FIG. 7C are prepared to perform the cutting work, the cutting work is resulted in the desired region 131. Further, in a case that a desired working region is a rectangular triangular shape like the region 161, when the cutting data 162 are prepared to perform the cutting work, the cutting work is resulted in the desired region 161.

Figure 8:
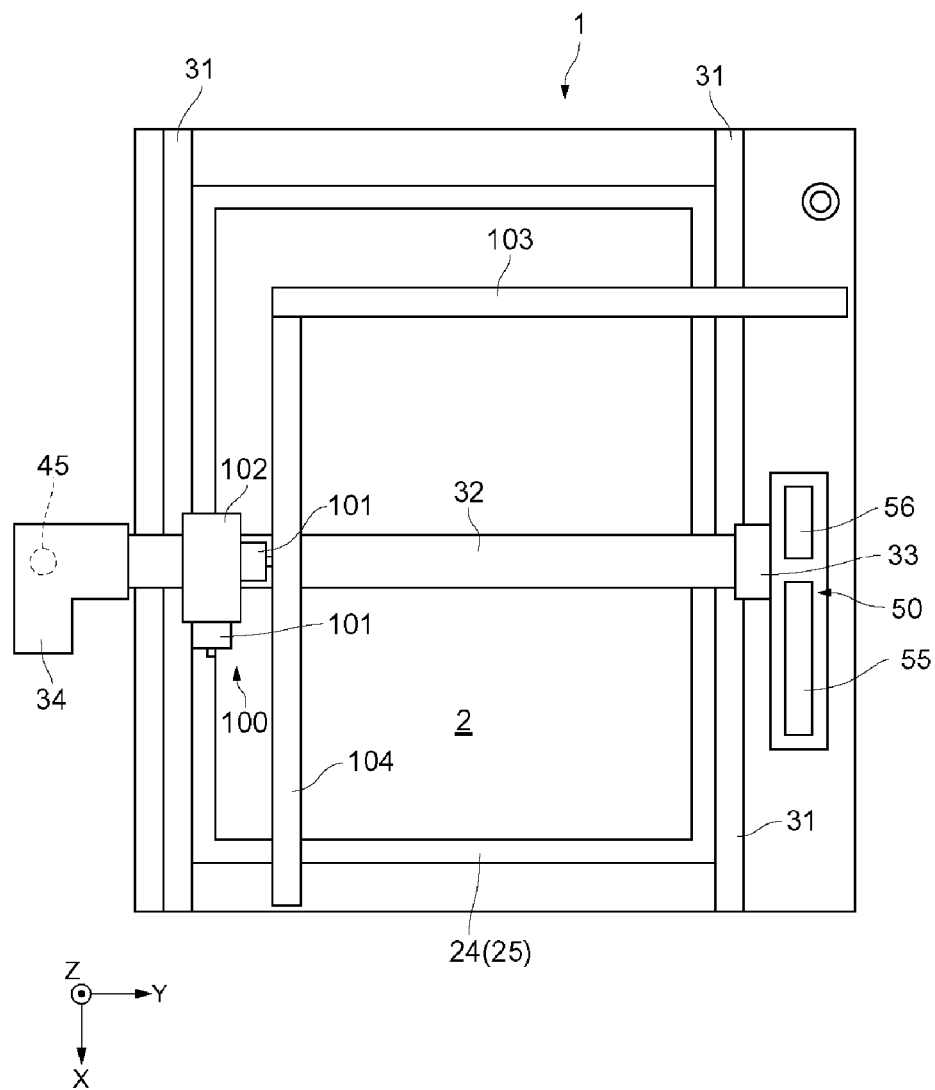
FIG. 8 is a top plan view showing a state where an "X"-direction jig, a "Y"-direction jig and a displacement sensor are attached to the cutting plotter.

Next, a method will be described below in which the bending of the guide rail 31 provided so as to extend in the "X"-axis direction is measured and the measurement result is applied to a cutting work. First, as shown in FIGS. 5B and 8, the protruded part 101a of the displacement sensor 101 is fitted into the fitting hole 102b of the sensor support member and thus the displacement sensor 101 is attached so that the tip end of the measuring part 101b is directed to the "Y"-axis positive direction. Then, the "Y"-direction jig 104 is disposed so that a protruded part (not shown) provided at its one end in the longitudinal direction is fitted and fixed to the hole part 103a of the "X"-direction jig 103 and a leg provided at its other end is placed on the placing part 21b (see FIG. 1) and then, a fine adjustment of position is performed so that the tip end of the measuring part 101b of the displacement sensor 101 is abutted with a side face of the "Y" direction jig 104.

Next, a case will be described below in which an upper end portion of the guide rail 31 is bent by a length "e3" in the "Y"-axis negative direction and its lower end portion is bent by a length "e4" in the "Y"-axis positive direction as shown in FIG. 9A. First, in a state that the "Y"-direction jig 104 is disposed as described above, the input part 55 is operated and the slider 41 is reciprocatedly moved in the "X"-axis direction and measurement of the bending of the guide rail 31 is performed. When the slider 41 is reciprocatedly moved in the "X"-axis direction, the displacement sensor 101 fixed and supported by the slider 41 is also reciprocatedly moved in the "X"-axis direction. As a result, the displacement sensor 101 outputs a guide rail shape measurement result 141 as shown in FIG. 9B of the shape whose upper end portion is bent by the length "e3" in the "Y"-axis negative direction and lower end portion is bent by the length "e4" in the "Y"-axis positive direction as a carriage shape data. The carriage shape reading section 51 reads the carriage shape data (guide rail shape measurement result 141) and transmits them to the cutting shape setting section 53.

After that, similarly to the case of measuring the bending of the "Y"-bar 32, the cutting shape setting section 53 calculates displacement of the bending in the "Y"-axis direction of the guide rail shape measurement result 141 with respect to the straight line 142 and prepares cutting data 143 in which the upper end portion is bent by the length "e3" in the "Y"-axis positive direction and the lower end portion is bent by the length "e4" in the "Y"-axis negative direction. As a result, when a cutting work for a medium 2 to be worked is performed on the basis of the cutting data 143 under a control of the drive control section 54, the bending of the guide rail 31 is canceled by the cutting data 143 and thus the cutting work is performed on the straight line 142. As described above, since the working shape data (desired working shape) are corrected to prepare the cutting data 143, the cutting work is performed without being affected by the bending of the guide rail 31. Therefore, for example, in a case that a desired working region is a rectangular shape like the region 151, when the cutting data 152 as shown in FIG. 9C are prepared to perform the cutting work, the cutting work is resulted in the desired region 151. Further, in a case that a desired working region is a rectangular triangular shape like the region 171, the cutting data 172 are prepared to perform the cutting work, the cutting work is resulted in the desired region 161.

As described above, the displacement sensors 101 are attached to the slider 41 and the carriage shape data obtained by using the jigs 103 and 104 are held in the carriage shape reading section 51 and, after the carriage shape data are held, the cutting shape setting section 53 always corrects the working shape data (desired working shape) by using the carriage shape data and the cutting work is performed. Further, the carriage shape data can be updated at any time by using the carriage shape measurement mechanism 100 as described above. For example, in a case that the cutting plotter 1 has been continuously used for many years and thus the shapes of the guide rail 31 and the "Y"-bar 32 have been varied, when the carriage shape data of the carriage shape reading section 51 are updated by using the carriage shape measurement mechanism 100 again, a problem of deterioration of working quality due to the shape variation of the guide rail 31 or the "Y"-bar 32 can be completely eliminated.

As described above, in the cutting plotter 1 in this embodiment, the bending of the guide rail 31 and the "Y"-bar 32 is measured by the carriage shape measurement mechanism 100 and a cutting work is performed on the basis of the cutting data which are prepared by correcting the working shape data (desired working shape) with the use of the measurement result. Therefore, a problem of deterioration of quality of an object to be worked due to the bending (tolerance of straightness) of the guide rail 31 and the "Y"-bar 32 can be eliminated.

Further, in this embodiment, the carriage shape data of the carriage shape reading section 51 are updated by using the carriage shape measurement mechanism 100 after the manufacture and before the shipment of the cutting plotter 1. However, timing when the carriage shape data are updated is not limited to the timing after the manufacture and before the shipment of the cutting plotter 1. For example, the carriage shape data may be updated every time when the power switch is turned on or updated at the time of maintenance of the cutting plotter 1.

Further, in the carriage shape measurement mechanism 100 in this embodiment, the bending of the guide rail 31 and the "Y"-bar 32 is measured by using a displacement sensor. However, a displacement sensor is not required to be used as an apparatus for measuring the bending. For example, a laser length measuring apparatus, a straightness measuring apparatus and the like may be used.

In addition, the embodiment of the present invention characterized in that the bending of the guide rail 31 and the "Y"-bar 32 is corrected by using the carriage shape measurement mechanism 100 and the carriage shape reading section 51 to perform a cutting work may be applied, in addition to the above-mentioned embodiment, for example, to another type cutting plotter such as a medium-to-be-worked drive type or a printer apparatus.

For example, instead of the cutting plotter 1 in which the end mill 43 is pressed against a medium 2 to be worked from an upper side (Z-axis positive direction) to perform a cutting work, the embodiment of the present invention may be applied to a cutting plotter in which a medium 2 to be worked is sucked and held so that its face to be worked is directed in a lateral direction (direction parallel to the "X-Y" plane) and the end mill 43 is pressed in the lateral direction to perform a cutting work, or the like.

A cutting plotter according to the embodiment includes a medium support means (for example, the work table 20 in the embodiment) which is provided with a support face for supporting a sheet-shaped medium to be worked, a first guide rail (for example, the guide rail 31 in the embodiment) which is provided in the medium support means so as to extend in a first direction that is parallel to the support face, a second guide rail (for example, the "Y"-bar 32 in the embodiment) which is attached so as to be movable in the first direction along the first guide rail and is provided so as to extend in a second direction that is parallel to the support face and intersects the first direction, a carriage (for example, the slider 41 in the embodiment) which is attached so as to be movable in the second direction along the second guide rail, a work tool (for example, the end mill 43 in the embodiment) which is attached to the carriage so as to be movable in a third direction that is perpendicular to the support face to perform a cutting work for the medium to be worked, a working control means (for example, the control unit 50 in the embodiment) which executes a control for moving the second guide rail in the first direction along the first guide rail, a control for moving the carriage in the second direction along the second guide rail, and a control for moving the work tool in the third direction with respect to the carriage to perform a cutting work for the medium to be worked by the work tool, and a second direction displacement detecting means (for example, the displacement sensor 101 and the "X"-direction jig 103 in the embodiment) which measures a second guide rail displacement amount indicating a magnitude of displacement of a moving path of the carriage from a predetermined moving path with respect to the second guide rail in a direction perpendicular to the second direction when the carriage is moved in the second direction along the second guide rail. The working control means executes a control in which a movement control of the second guide rail on the first guide rail is added so that the second guide rail displacement amount is corrected in a movement control of the carriage on the second guide rail.

Further, in the cutting plotter in accordance with the embodiment, it is preferable that the cutting plotter is provided with a first direction displacement detecting means (for example, the displacement sensor 101 and the "Y" direction jig 104 in the embodiment) which measures a first guide rail displacement amount indicating a magnitude of displacement of a moving path of the second guide rail from a predetermined moving path with respect to the first guide rail in a direction perpendicular to the first direction when the second guide rail is moved in the first direction along the first guide rail, and the working control means executes a control in which a movement control of the carriage on the second guide rail is added so that the first guide rail displacement amount is corrected in a movement control of the second guide rail on the first guide rail.

Further, it is preferable that the first and the second guide rails are provided so as to extend along a straight line, the first direction displacement detecting means measures bending of the first guide rail, and the second direction displacement detecting means measures bending of the second guide rail.

In the cutting plotter in accordance with the embodiment, the second direction displacement detecting means is provided which detects displacement from a predetermined moving path in a direction perpendicular to the second direction on the basis of a moving path when the carriage is moved along the second guide rail, and a control is added for moving the second guide rail in the first direction with respect to the first guide rail so that the displacement is corrected. According to this structure, bending of the second guide rail supporting the carriage is measured before a cutting work is performed and movement of the second guide rail in the first direction with respect to the first guide rail is controlled on the basis of the measurement result to be capable of correcting the movement of the work tool with respect to a medium to be worked. Therefore, even when bending and the like are occurred in the second guide rail which supports the carriage, quality deterioration of a cutting work due to the bending is prevented.

Further, a displacement detecting means is provided which detects displacement in a direction perpendicular to the first direction from a predetermined moving path on the basis of a moving path when the second guide rail is moved along the first guide rail, and a control is added for moving the carriage in the second direction along the second guide rail so that the displacement is corrected. As a result, even when bending and the like are occurred in the first guide rail which supports the second guide rail, quality deterioration of a cutting work due to the bending is prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A cutting plotter comprising:
a medium supporter including a support face provided to support a sheet-shaped medium to be worked;
a first guide rail provided in the medium supporter and extending in a first direction substantially parallel to the support face;
a second guide rail provided to be movable in the first direction along the first guide rail and extending in a second direction, the second direction being substantially parallel to the support face and intersecting the first direction;
a carriage provided to be movable in the second direction along the second guide rail;
a work tool attached to the carriage to be movable in a third direction to perform a cutting work for the sheet-shaped medium to be worked, the third direction being substantially perpendicular to the support face;
a working controller configured to execute a control for moving the second guide rail in the first direction along the first guide rail, a control for moving the carriage in the second direction along the second guide rail, and a control for moving the work tool in the third direction with respect to the carriage to perform a cutting work for the sheet-shaped medium to be worked by the work tool;
a second direction displacement detector configured to measure a second guide rail displacement amount, the second guide rail displacement amount indicating a magnitude of displacement of a moving path of the carriage from a predetermined moving path with respect to the second guide rail in a direction perpendicular to the second direction when the carriage is moved in the second direction along the second guide rail; and
the working controller being configured to execute a control in which a movement control of the second guide rail on the first guide rail is added so that the second guide rail displacement amount is corrected in a movement control of the carriage on the second guide rail,
wherein the cutting plotter further comprises:
a first direction displacement detector configured to measure a first guide rail displacement amount, the first guide rail displacement amount indicating a magnitude of displacement of a moving path of the second guide rail from a predetermined moving path with respect to the first guide rail in a direction perpendicular to the first direction when the second guide rail is moved in the first direction along the first guide rail,
wherein the working controller is configured to execute a control in which a movement control of the carriage on the second guide rail is added so that the first guide rail displacement amount is corrected in a movement control of the second guide rail on the first guide rail.

2. The cutting plotter according to claim 1, wherein
each of the first and second guide rails extends on a straight line.

3. The cutting plotter according to claim 1, wherein
each of the first and second guide rails extends on a straight line,
the first direction displacement detector is configured to measure bending of the first guide rail, and
the second direction displacement detector is configured to measure bending of the second guide rail.

* * * * *